United States Patent [19]

Branch, III

[11] 4,437,164
[45] Mar. 13, 1984

[54] RIDGE CIRCUIT COMPENSATION FOR ENVIRONMENTAL EFFECTS

[75] Inventor: Howard R. Branch, III, Northfield, Conn.

[73] Assignee: Bristol Babcock Inc., Waterbury, Conn.

[21] Appl. No.: 240,938

[22] Filed: Mar. 5, 1981

[51] Int. Cl.³ ............................................. G06F 15/20
[52] U.S. Cl. ................................... 364/571; 364/508; 364/557; 73/766
[58] Field of Search ............... 364/508, 571, 558, 573, 364/581, 582, 557; 73/765, 766, 767, 721

[56] References Cited

U.S. PATENT DOCUMENTS

| | | | |
|---|---|---|---|
| 4,114,442 | 9/1978 | Pratt | 364/557 X |
| 4,172,387 | 10/1979 | Rzekiel et al. | 73/719 |
| 4,172,388 | 10/1979 | Gabrielson | 73/721 |
| 4,172,389 | 10/1979 | Branch | 73/766 |
| 4,174,639 | 11/1979 | Raven | 73/766 |
| 4,192,005 | 3/1980 | Kurtz | 364/571 |
| 4,198,676 | 4/1980 | Varnum et al. | 364/557 |
| 4,205,556 | 6/1980 | Runyan | 73/721 X |
| 4,263,655 | 4/1981 | Chappell, Jr. | 364/558 |
| 4,303,984 | 12/1981 | Houvig | 364/558 |
| 4,321,832 | 3/1982 | Runyan | 364/558 X |
| 4,336,595 | 6/1982 | Adams et al. | 364/508 |

*Primary Examiner*—Edward J. Wise
*Attorney, Agent, or Firm*—Pennie & Edmonds

[57] ABSTRACT

A method and apparatus are described for using a computer to compensate for zero point and span errors as well as other non-linearities in the operation of strain gauge transducers. The apparatus comprises a semiconductor strain gauge transducer with a quasi stable voltage supply, two strain gauges and two precision resistors which form a voltage divider network; a scanner for scanning the strain gauges and precision resistors; an analog-to-digital converter for digitizing the output of the scanner; and a microprocessor for calculating a corrected output representing the phenomenon that is monitored by the strain gauge transducer. The microcomputer contains a memory in which are stored a set of bridge completion constants, a table of correction constants and a set of temperature compensation and signal conditioning algorithms. The bridge completion constants are a set of values representative of the bridge supply voltage and the resistances of a set of bridge completion resistors which are selected during factory calibration to provide two point temperature and two point span compensation for the pair of strain gauges used in the transducer. One group of correction constants provides for zero point compensation over the operating temperature range of the transducer, a second group provides for span compensation and a third group compensates for other input to output nonlinearity.

85 Claims, 12 Drawing Figures

RIDGE CIRCUIT COMPENSATION FOR ENVIRONMENTAL EFFECTS

TECHNICAL FIELD

This relates to the compensation of electrical devices for changes in their resistance, capacitance or inductance due to one or more environmental factors. More particularly, it relates to a computer simulated bridge circuit which compensates for such factors in the operation of electrical devices. Because the electrical devices of primary interest are semiconductor strain gauges, the invention will be described in terms of such application. It will be recognized, however, that the principles disclosed have application to other devices as well.

BACKGROUND ART

Metallic strain gauges have been used as transducers for many years. More recently, semiconductor strain gauges have come into use having sensitivities that are hundreds of times greater than that of their metallic counterparts.

A strain gauge is typically used by bonding it to a flexible object and measuring the change in voltage across the gauge or the change in gauge resistance as different loads are applied to the object to vary the stress on the gauge. It is particularly advantageous to use a Wheatstone bridge in which two strain gauges are connected in series in one half of the bridge and two resistors are connected in series in the other half. Each of these four elements is in a separate arm of the bridge with the supply voltage applied to the nodes between the two halves and the output voltage measured between the node between the two resistors and the node between the two strain gauges. If the gauges are mounted on opposite sides of the object so that bending of the object applies a tensile loading (or stress) to one gauge and a compressive loading to the other, the ratio of the resistance of the two strain gauges is a function of the amount of deflection in the object. Hence, the output voltage from the bridge circuit can be related to the amount of deflection in the object. In a pressure-to-displacement transducer such as that shown in Birger B. Gabrielson's U.S. Pat. No. 4,172,388, which is incorporated herein by reference, this provides a convenient means of producing an output electrical signal which is a function of the pressure exerted by a fluid.

Ideally, a strain gauge should have the same resistance at any constant stress throughout its operating temperature range and its resistance should vary linearly with the stress that is applied. Thus, as shown in Fig. 1, a plot of strain gauge resistance (or voltage drop) versus temperature and stress is ideally a flat rectilinear surface 10. In practice, however, the resistance of a semiconductor strain gauge is a function of both stress and temperature and the plot of strain gauge resistance versus temperature and stress is neither flat nor rectilinear.

Practical semiconductor strain gauges are very sensitive to variations in temperature. For example, the resistance of a strain gauge at 180° F. (82° C.) may be twice that of a strain gauge at 0° F. (−18° C.) at the same pressure. Moreover, strain gauges have both a temperature coefficient of resistance and a temperature coefficient of gauge factor or sensitivity. Thus, both their resistance and their rate of change of resistance with applied stress vary with temperature. Even worse, the magnitude of both coefficients varies randomly from one gauge to the next; and the process of bonding the gauges is very likely to modify both the resistance and the temperature coefficients of the gauges. Thus, while it is possible to select matched pairs of semiconductor strain gauges whose temperature coefficients are approximately the same and to use such matched pairs in a bridge circuit to cancel out some errors due to variations in temperature, temperature effects still remain which will produce significant errors in the signal produced by the bridge circuit.

A plot of actual strain gauge resistance versus temperature and stress is typically a curved non-rectilinear surface such as a surface 15 of FIG. 1. As shown by surface 15, there are three types of error associated with the semiconductor strain gauge. First is the error in zero point, i.e., the variation A with temperature in the resistance of the strain gauge when the strain gauge is in the unstrained state. This error is random in both polarity and magnitude from one gauge to another. Second is the error in span, i.e., the variation B - (C-A) with temperature in the difference between the resistance of the strain gauge at maximum loading and its resistance in the unloaded, zero-point-corrected state. This error is uniform in polarity but random in magnitude from one gauge to another. The third error depicted by surface 15 is non-linearity of response with stress. As will be apparent, these variations in strain gauge resistance also lead to variations in the output voltage from the strain gauge bridge circuit.

Corrections are made for this variation in output voltage because of changes in resistance with temperature by measuring the resistance of the gauges under zero stress at two temperatures and selecting a series/parallel network of resistance for one gauge which offsets the effects of its temperature coefficient of resistance enough that the ratio of the resistance in the two strain gauge arms at the two compensation temperatures is identical. As a result, the output of the bridge circuit at zero stress is the same for both temperatures. This process is called two-point temperature compensation. It is also called zero or initial value compensation. Obviously, such compensation could be made instead at any other value of stress and accordingly this technique will be referred to generically as constant value compensation. As disclosed in my U.S. Pat. No. 4,172,389, which is incorporated hereby by reference, this technique can be extended so that the ratio of the resistances in the two strain gauge arms is substantially the same at three different temperatures, thereby providing three-point temperature (or constant value) compensation.

While such temperature compensation does improve the performance of the circuit as a measuring device, it does not guarantee that the resistance ratios are the same at any other temperature because of the complex effects of the temperature induced strain in the gauges. Moreover, temperature compensation alone makes no correction for the variation in output voltage because of change in sensitivity with temperature.

The variation in output voltage because of change in sensitivity with temperature may be compensated by the use of a span compensation resistance. The value of this resistance is selected to balance the temperature coefficient of sensitivity. More particularly, in one method, once the bridge is temperature compensated at its two compensation temperatures, its output voltage is measured at these two temperatures with maximum deflection being applied to the object on which the gauges are mounted. A resistor is then selected so that the output voltage under maximum stress is the same at both compensation temperatures. Alternatively, as shown in my U.S. Pat. No. 4,172,389, a value for the span compensation resistance can be determined from a series of measurements performed on the strain gauges when connected in series with an arbitrary resistance. These techniques generally are referred to as span compensation.

These techniques provide for span compensation at only two values of temperatures. Span compensation at other temperatures can be approximated by the use of a resistor-thermistor network as disclosed in John Raven's U. S. Pat. No. 4,174,639, which is incorporated herein by reference.

Despite the improvements in accuracy that can be achieved by two- and three-point temperature compensation and by span compensation, there is still substantial residual error at temperatures other than those where the compensation was made. The major causes of these errors are the non-tracking of the compensated gauges at temperatures other than the compensation temperatures, the inaccuracies in resistance of the compensation resistors, and the temperature coefficient of the resistors used for compensation as well as for the other elements in the bridge circuit. Other sources of error are the mismatch in the temperature offsets in the amplification of the output signal from the bridge, the temperature coefficient of the voltage source applied to the bridge, the mismatch between the true span error curve and the variable voltage provided by the resistor-thermistor network, and the temperature coefficients and inaccuracies in many other less critical components. For example, the cumulative effect of these errors may result in an error of ½% of full scale per 100° F. (56° C.) in the output of the bridge circuit under zero stress and up to 1% of full scale under other stresses. Moreover, as is apparent from the '389 and '639 patents, the improvements in accuracy that are achieved are won only at the cost of custom-tailoring the various compensation resistances to the idiosyncrasies of individual strain gauges.

DISCLOSURE OF INVENTION

I have devised a method and apparatus for compensating for the foregoing errors in the operation of strain gauge transducers. Moreover, the method and apparatus I have devised are generally applicable to the compensation of all types of devices for deviations from ideal performances over their operating ranges.

In a preferred embodiment of my invention the apparatus comprises a semiconductor strain gauge transducer with a quasi-stable voltage supply, two strain gauges and two precision resistors which form a voltage divider network; a scanner for scanning the strain gauges and precision resistors; an analog-to-digital converter for digitizing the output of the scanner; and a microprocessor for calculating a corrected output representing the phenomenon that is monitored by the strain gauge transducer. Alternatively, one of the precision resistors may be a short circuit. Advantageously, the gauges are mounted in customary fashion on opposite sides of a flexible object which is bent as a function of the parameter being measured. When the gauges are so mounted in opposition, flexing of the object puts one gauge into compression thereby decreasing its resistance and puts the other gauge into tension thereby increasing its resistance. Since these changes in resistance are approximately equal, the sum of the resistances of the two gauges is relatively insensitive to stress while being highly sensitive to temperature. The scanner successively reads the voltage drops across the two strain gauges and the two precision resistors. These analog signals are then converted to digital form by the A/D converter and entered into the microcomputer for calculation of the output.

The microcomputer contains substantial memory in which are stored a set of bridge completion constants, a table of correction constants and a set of temperature compensation and signal conditioning algorithms. The bridge completion constants are a set of values representative of the bridge supply voltage and the resistances of a set of bridge completion resistors which are selected during factory calibration to provide two point temperature and two point span compensation for the pair of strain gauges used in the transducer. The table of correction constants is likewise determined during factory calibration. One group of these constants provides for zero point compensation over the operating temperature range of the transducer, a second group provides for span compensation over the operating temperature range of the transducer, and a third group compensates for other input to output non-linearities over the operating range of the transducer. The constants stored in each of these groups are the slopes and intercepts of the appropriate compensation curves at several discrete points over the operating temperature or stress range. Pursuant to the temperature compensation and signal conditioning algorithms stored in the microcomputer, the microcomputer uses the signals from the A/D converter, the bridge completion constants and the correction constants to calculate a corrected output signal representative of what is measured by the strain gauge transducer.

In accordance with my invention, the digital signals applied to the microcomputer are corrected for voltage offsets and temperature related errors in the scanner and A/D circuit by measuring the voltages across the precision resistors, determining the voltage offset from the output signals from the A/D circuit and subtracting this voltage error from the voltage measurements across the strain gauges. Alternatively, where one of the precision resistors is replaced by a short circuit, the voltage offset is simply the output of the A/D circuit when the scanner's inputs are shorted. Since the resistance of the precision resistor is accurately known, the ratios of the voltage drops across the strain gauges to the voltage drop across the precision resistor are then used to determine the resistance values of the two strain gauges.

After the resistance values are calculated, they are used with the bridge completion constants to calculate the output voltage that would be observed from a Wheatstone strain gauge bridge that used the two strain gauges of the sensor together with the bridge completion resistors and the bridge supply voltage having the values specified by the bridge completion constants. This process may be termed primary temperature compensation. As indicated above, the values of these bridge completion constants are selected during factory calibration so that the output of this bridge circuit is temperature compensated at two points and is also span compensated at two points. The selection of appropriate bridge resistance values to provide for two point temperature and two point span compensation is well within the skill of the art.

After this primary temperature compensation procedure is carried out, a secondary process is implemented to compensate for temperature effects using the first two groups of correction constants stored in the memory of the microprocessor. This process is essentially a search and interpolation routine to locate the proper slope and intercept to use for correction and then calculate the precise correction factor. However, since the output signal from the primary temperature compensation process is not a monotonic function of temperature, some other signal must be used to select a unique set of correction constants. One possibility is to measure directly the operating temperature of the strain gauges and select the appropriate correction factors accordingly. This, however, requires the use of separate temperature sensors and accompanying circuitry. Since the sum of the resistances of the two strain gauges mounted in opposition is a highly sensitive monotonic function of temperature that is substantially independent of stress, I prefer to relate the correction factors to this sum, thereby eliminating the need to make any measurement of temperature. After the appropriate constants are selected in accordance with the sum of the resistances of the two strain gauges, this sum and the selected correction constants are used to calculate a temperature compensated output voltage.

Finally, the temperature compensated output signal is corrected for non-linearity of output as a function of an input such as the stress applied to the transducer. Since the temperature compensated output signal is a monotonic function of the applied stress, the correction constants may be related directly to this output signal. Thus the appropriate slope and intercept correction constants are selected in accordance with the value of the temperature compensated output signal; and this value and the correction constants are used to calculate an output signal that has been corrected for non-linearities due to both temperature and stress.

The foregoing method and apparatus offers many distinct advantages over a conventional Wheatstone bridge strain gauge sensor. Since the fully compensated output voltage is calculated from the voltage drops read by the scanner, it is only necessary that the supply voltage be stable for the relatively short period required to scan the precision resistors and strain gauges. Thus, fluctuations or temperature related changes in the supply voltage do not affect the accuracy of measurement. Moreover, the use of resistance values in calculating the output signals makes the calculations independent of the voltage applied to the digital network. This permits the voltage level applied to my strain gauge sensor to be significantly lower than that for systems which utilize a conventional Wheatstone bridge circuit.

Furthermore, the fully compensated output signal is far more accurate than that which can be produced by the equivalent hard-wired Wheatstone bridge. Unlike actual resistors and supply voltages whose values change as a function of temperature, the values of the bridge completion constants and the compensation constants used in the practice of my invention do not change with temperature. As a result, all the temperature errors of a Wheatstone bridge that are not directly associated with the strain gauges are eliminated. Second, the gain constant, which is equivalent to the excitation voltage in a hardwired bridge, can be chosen to provide any output range without the constraints imposed on a hardware bridge by the maximum excitation voltage that can be tolerated by the gauges or by the signal conditioning electronics without degradation in performance. In particular, the bridge compensation constants and gain constant can be selected during the factory calibration procedure to provide a standard zero and full scale signal regardless of the stress range over which the individual device will be operated. Since all of this can be achieved simply by altering the constants stored in the microprocessor, the strain gauge sensors of my invention may readily be customized for individual application. As a result, the preferred embodiment of my invention is an extremely accurate, highly versatile strain gauge transducer.

BRIEF DESCRIPTION OF THE DRAWINGS

These and other objects, features, elements and advantages of my invention will be readily apparent from the following description in which:

FIG. 2 is a schematic diagram of an illustrative embodiment of my invention;

BEST MODE OF CARRYING OUT THE INVENTION

Figure 1:
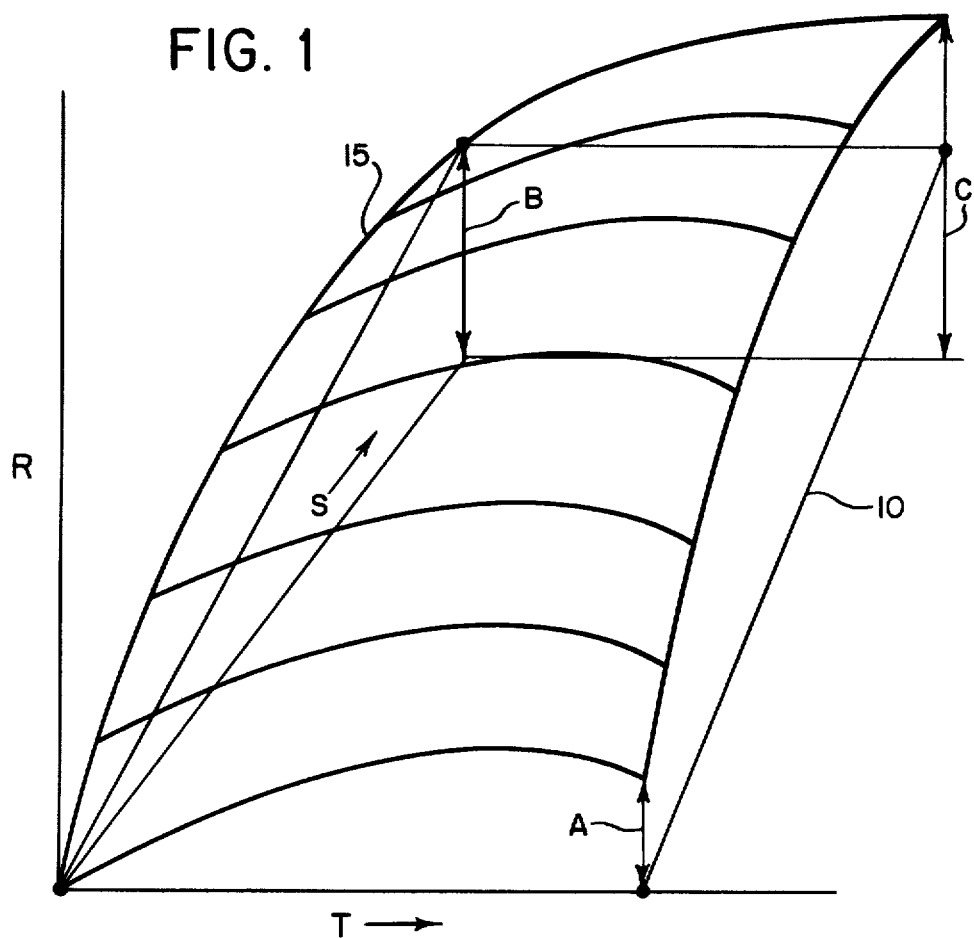
FIG. 1 is a plot of the resistance of a strain gauge sensor as a function of stress and temperature.

As shown in FIG. 2, preferred apparatus 20 for carrying out my invention comprises a semiconductor strain gauge sensor 30, a scanner 40, an A/D converter 50, a microcomputer 60 and an output circuit 80. Strain gauge sensor 30 further comprises a quasi-stable voltage supply 32, first and second precision resistors 34, 35, and first and second strain gauges 36, 37. If desired, the second precision resistor may be a short circuit. Strain gauges 36, 37 are preferably mounted on opposite sides of a cantilever beam (not shown) so that one gauge is compressed and the other is tensed when the beam moves in response to the phenomenon being measured. An example of such a mounting, which is commercially available, is disclosed on the aforementioned patent of Berger B. Gabrielson. Scanner 40 successively reads the voltage drops V1, V2, V3, V4, across precision resistor 34, the two strain gauges 36, 37 and precision resistor 35, respectively. The analog signals so read by scanner 40 are converted to digital form by A/D converter 50 and entered into microcomputer 60 for calculation of the output. As will be apparent to those skilled in the art, any number of techniques may be used for analog-to-digital conversion. The output calculated by microcomputer 60 may be used to drive a display, run a strip-chart recorder or control any number of other well known output devices represented schematically by output circuit 80.

Microcomputer 60 comprises a central processing unit 62, a memory 64, an I/0 bus 66 and an internal bus 68. Memory 64 preferably includes a random access memory (RAM) 71, a read only memory (ROM) 72 and a programmable read only memory (PROM) 73. A program for operation of the microcomputer is stored in read only memory 72. This program includes temperature compensation and signal conditioning algorithms used to calculate the output signal. A set of bridge completion constants and a table of correction constants are stored in programmable read only memory 73. These constants are determined during factory calibration of strain gauges 36, 37 and are a unique set of values intended to correct the output of that particular pair of strain gauges in order to compensate for temperature effects, as well as non-linearity of the transducer with the applied input. In addition, the bridge completion constants may be selected so as to provide a standard zero and full scale signal regardless of the stress range for which the particular unit of apparatus will be used.

To determine the bridge completion constants and the table of correction constants for each strain gauge transducer, the voltage drops across precision resistors 34, 35 and strain gauges 36, 37 are measured at several different temperatures for both zero and maximum stress as well as at several different stresses and minimum temperature. These measurements are typically made at five to seven values over the range of interest. The measured voltage drops are corrected for voltage offsets and temperature related errors by subtracting from these values an error voltage, EV. The corrected values are:

$$VR = V1 - EV$$
$$VGA = V2 - EV$$
$$VGB = V3 - EV \quad (1)$$

where V1, V2, and V3 are the signals defined above as received by microcomputer 60, VR is the corrected value of the voltage drop across resistor 34 and VGA and VGB are the corrected values of the voltage drops across gauges 36, 37. The error voltage may be determined in many ways. In the case where the resistance of precision resistor 34 is twice that of precision resistor 35, the error voltage EV is given by $EV = 2V4 - V1$ where $V_1$ and $V_4$ are the signals representative of the voltage drops across the precision resistors as received by microcomputer 60. Where the second precision resistor is replaced by a short circuit, the error voltage EV is given by $EV = V4$, where V4 is the signal received by the microcomputer when the inputs to the scanner are shorted. Since the resistance R of precision resistor 34 is known, the resistance of gauges 36, 37 can be calculated as follows:

$$GA = (VGA/VR) \cdot R$$
$$GB = (VGB/VR) \cdot R \quad (2)$$

where VGA, VGB, VR, and R are as defined above.

Using the gauge resistance values so calculated for the minimum and maximum temperatures for both zero and maximum stress, appropriate bridge completion constants are first calculated for two point temperature compensation and two point span compensation. Using these bridge completion constants and the gauge resistance values calculated for the intermediate temperatures and zero stress, a piece-wise linear approximation to the zero point temperature compensation curve is then calculated for the operating temperature range of the sensor. The slopes and intercepts of the piece-wise linear components provide the correction constants for temperature compensation. Once these correction constants are calculated, a piece-wise linear approximation to the compensation curve for span error is calculated. Again the slopes and intercepts of the piece-wise linear components constitute the correction constants for span error. Finally, using the calculated gauge resistances for several different stress levels between zero and maximum a piece-wise linear approximation is calculated to the compensation curve for non-linearity of the transducer in response to the applied input. Again the slopes and intercepts of the piece-wise linear components constitute the correction constants for this non-linearity.

This procedure is carried out for each strain gauge transducer made in accordance with my invention. Advantageously, the scanner and A/D converter used in measuring the voltage drops across the precision resistors 34, 35 and strain gauges 36, 37 should be the same scanner 40 and A/D converter 50 that are connected to sensor 30 in the device as finally shipped. The calculations that are performed to determine the bridge completion constants and the table of correction constants may be performed by microcomputer 60 that is shipped as part of the final product. Alternatively, they may be performed by separate calibration equipment (not shown).

Figure 3:
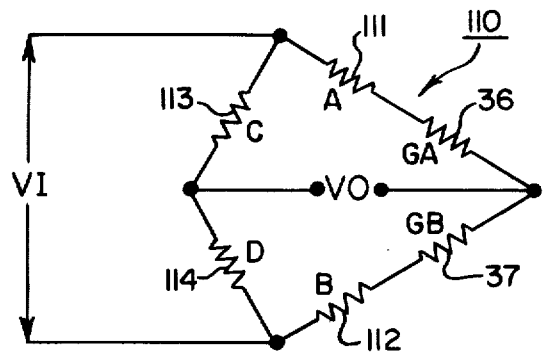
FIG. 3. is a schematic diagram of a bridge circuit useful in understanding my invention.

Numerous techniques are available to compensate strain gauge bridges at two points for errors in zero point and/or span. My invention may be practiced using any of these techniques. I prefer to select the bridge completion constants in the following fashion. For calculation purposes, the calibration equipment simulates a conventional strain gauge bridge 110 as shown in Fig. 3. This bridge comprises four resistors 111, 112, 113, 114 and the two strain gauges 36, 37. Resistors 111, 112 and strain gauges 36, 37 are connected in series in the active half of the bridge. Resistors 113, 114 are connected in series to form the reference half of the bridge. An input (or supply, or excitation) voltage VI is applied to the nodes between the two halves of the bridge; and the output voltage VO is measured between the node between resistors 113, 114 and the node between strain gauges 36, 37. It can readily be shown that $$VO = VI \left( \frac{GB + B}{GA + A + GB + B} - \frac{D}{C + D} \right) \quad (3)$$

where GA and GB are the resistances of strain gauges 36, 37 and A, B, C and D are the resistances of resistors 111, 112, 113, and 114, respectively. Two point temperature and span compensation can be achieved by appropriate selection of the resistance of resistors 111, 112.

In particular, it can be shown that span compensation can be achieved for two temperatures L, H if the sum of the resistance of resistors 111, 112 is given by:

$$A + B = \frac{VG(H,M) - VG(L,M)(VO(H)/VO(L))}{(VR(L,M)/R)(VO(H)/VO(L)) - VR(H,M)/R} \quad (4)$$

where

VG(H,M) = VGA(H,M) + VGB(H,M)
VG(L,M) = VGA(L,M) + VGB(L,M)
VO(H) = (R + GA(H,Z)) VR(H,Z)/R
    − (R + GA(H,M)) VR(H,M)/R
VO(L) = (R + GA(L,Z)) VR(L,Z)/R
    − (R + GA(L,M)) VR(L,M)/R
H = the upper temperature L = the lower temperature
Z = zero stress
M = maximum stress R, VR, VGA and VGB are as defined in equations (1) and (2) and GA(T,S) is the resistance of gauge 36 at the temperatures T and stresses S indicated. For the value of A + B determined by equation (4), the output voltage $VO_s$ of the bridge circuit is the same at maximum stress at both the lower and upper temperatures L, H.

For two point temperature compensation it can be shown that the total resistance A + B should be distributed between resistors 111 and 112 so that:

$$\frac{GA(H,Z) + A}{GB(H,Z) + B} = \frac{GA(L,Z) + A}{GB(L,Z) + B} \qquad (5)$$

where GA(T,S) and GB(T,S) are the resistances of gauges 36, 37 at the temperatures T and stresses S indicated. Accordingly, specific values of A and B are determined by the calibration equipment by solution of equations (4) and (5). For these specific values of A and B, the output voltage $VO_z$ of the bridge circuit is the same at zero stress at both the lower and upper temperatures L, H.

It is not necessary to determine discrete values for the resistances C, D of resistors 113, 114. Instead, the value of the ratio D/(C+D) is calculated by the calibration equipment from equation (3) so that the output voltage VO has a desired value at zero stress. Typically, the desired output voltage at zero stress is zero so $$D/(C + D) = \frac{GB(Z) + B}{GB(Z) + B + GA(Z) + A} \qquad (6)$$

Finally, a suitable excitation voltage VI is chosen, preferably one which produces a full scale output signal VO at maximum stress. The values A, B, D/(C+D), and VI are the bridge completion constants for the pair of strain gauges 36, 37 for which they are calculated. These values are stored in PROM 73 of the microcomputer that is part of the same apparatus as these gauges.

Figure 4:
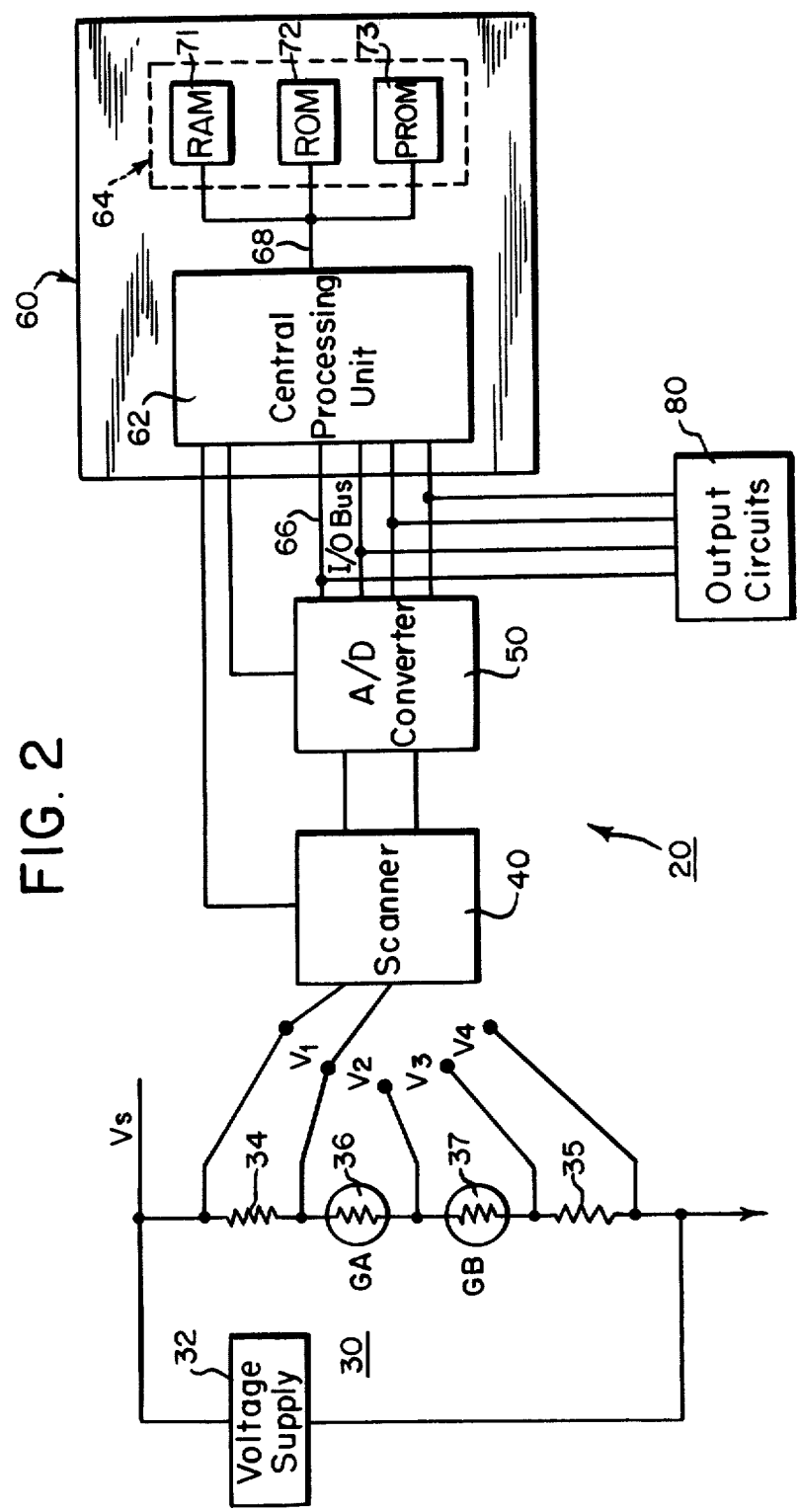
FIG. 4 is a plot of the typical error in zero point when compensated at two points.
Figure 5:
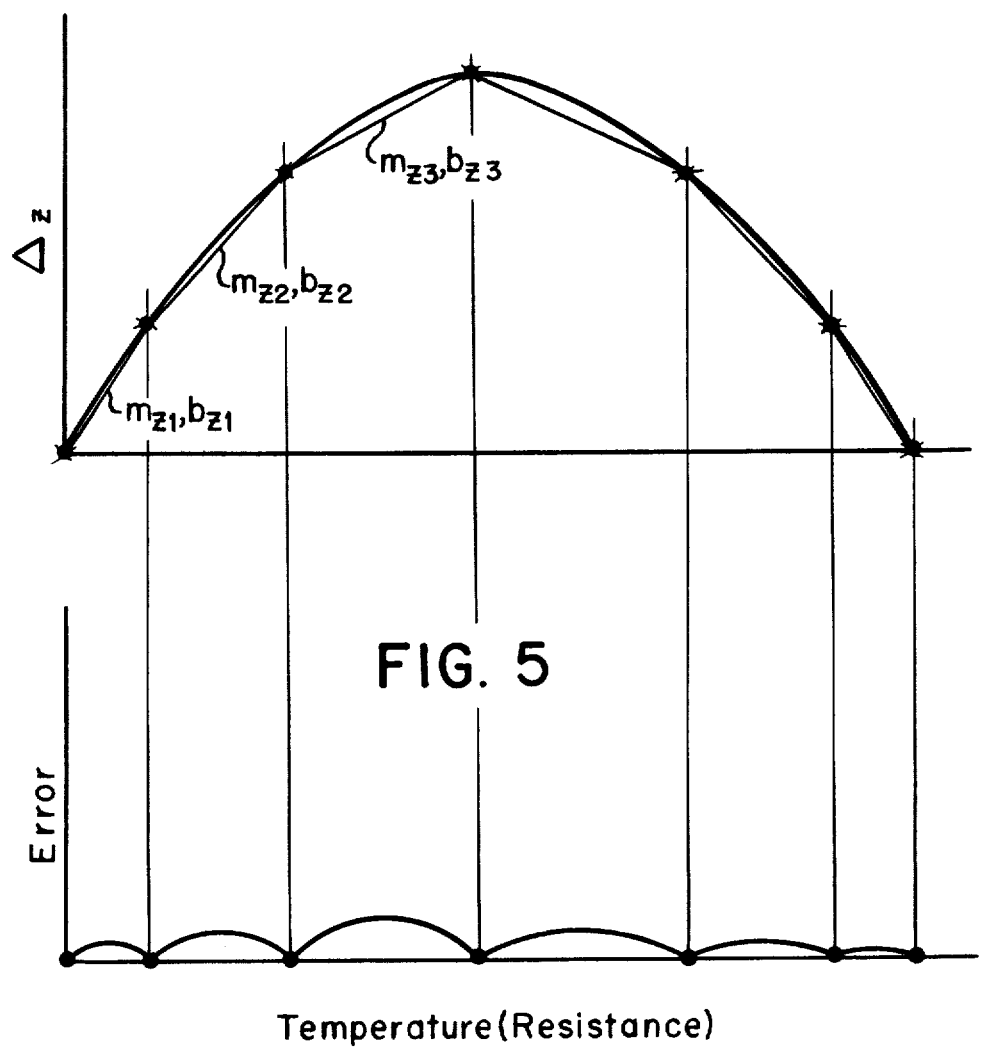
FIG. 5 is a plot of the typical error in zero point when compensated in accordance with my invention.

Once the bridge completion constants are determined, the calibration equipment calculates the table of correction constants which likewise is eventually stored in PROM 73 of the microcomputer associated with the strain gauges 36, 37 for which these correction constants are calculated. First the calibration equipment calculates the magnitude $VO_{zi}$ of the output of the bridge circuit at several intermediate temperatures and zero stress. The difference $\Delta$ zi between each of these values and the output value $VO_z$ determined by equation (3) for the minimum and maximum temperatures at zero stress is then calculated:

$$\Delta_{zi} = VO_{zi} - VO_z \ (i = 1, 2, \ldots) \qquad (7)$$

as shown in FIG. 4, these differences may be linked together by straight lines to form a piece-wise linear approximation to the curve of zero point error versus temperature. The calibration equipment calculates the slopes $m_{zi}$ and intercepts $b_{zi}$ of each of these piecewise linear components and retains this information and the temperature ranges for which each slope and intercept are used for inclusion in the table of correction constants. Use of these correction constants will reduce the zero point error to a curve such as that shown in FIG. 5. In practice, the use of a five to seven intermediate temperature values i has given satisfactory results. Obviously greater accuracy can be achieved by using even more values and fewer values may be used if the loss in accuracy is acceptable.

Next, the calibration equipment calculates the magnitude $VO_{si}$ of the output of the bridge circuit at the same intermediate temperatures (i = 1, 2, ...) and maximum stress using equation (3), the bridge completion constants and the values GA, GB of the strain gauge resistances at these intermediate temperatures and maximum stress. The difference or span $\Delta_{si}$ between each of these values $VO_{si}$ and the uncompensated output $VO_{zi}$ of the bridge circuit at the same temperature and zero stress is then determined:

$$\Delta_{si} = VO_{si} - VO_{zi} \ (i = 1, 2, \ldots) \qquad (8)$$

The calibration equipment then calculates the ratio $R_{si}$ of the span, $VO_s - VO_z$, in the output values of the bridge circuit as determined by equation (3) for maximum stress and zero stress at either the minimum or the maximum temperatures to the span $\Delta_{si}$ for each intermediate temperature:

$$R_{si} = (VO_s - VO_z) / \Delta_{si} \ (i = 1, 2, \ldots) \qquad (9)$$

Figure 6:
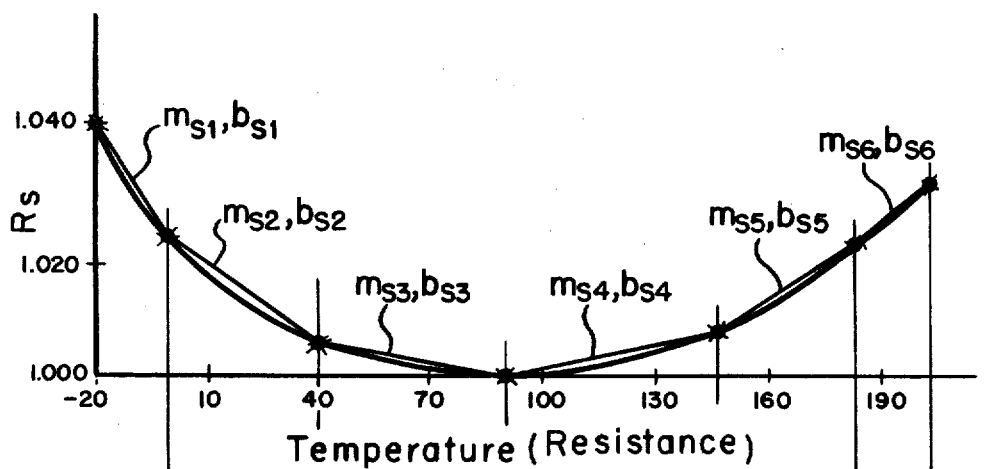
FIG. 6 is a plot of the typical error in span when compensated at two points.
Figure 7:
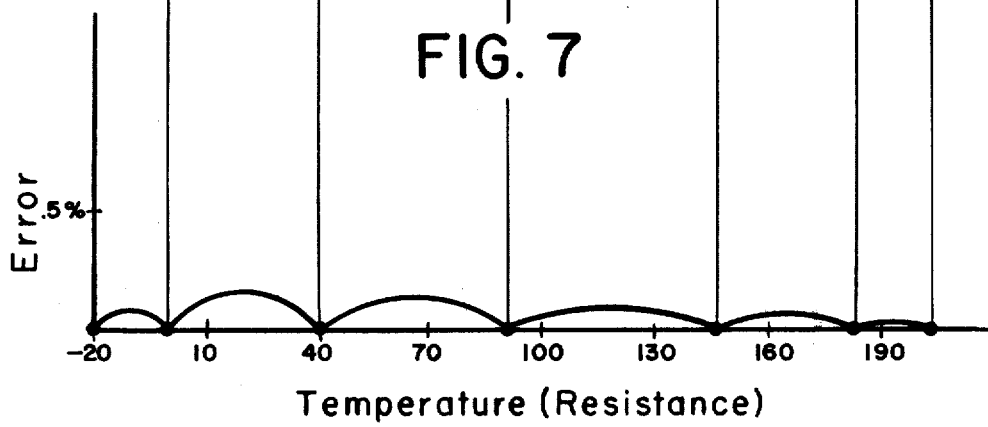
FIG. 7 is a plot of the typical error in span when compensated in accordance with my invention.

As will be apparent, each value $R_{si}$ is a correction factor for span error. As shown in FIG. 6, the span correction factors may be linked together by straight lines to form a piece-wise linear approximation to the span error correction curve versus temperature. The calibration equipment calculates the slopes $m_{si}$ and intercepts $b_{si}$ of each of these piece-wise linear components and retains this information and the temperature ranges for which each slope and intercept are used for the table of correction constants. Use of these correction constants will reduce the span error to a curve such as that shown in FIG. 7.

As indicated above, the correction factors may be related directly to temperature if separate temperature sensors and accompanying circuitry are used. I prefer, however, to relate the correction factors to the sum, GA+GB, of the corrected values of the resistances of strain gauges 36, 37. When these gauges are mounted in opposition, the sum of their resistances is a highly sensitive monotonic function of temperature that is substantially independent of stress. Since the values of the resistances GA and GB are available in the microcomputer, the sum of these resistances SUM=GA+GB is readily calculated at each intermediate temperature (i = 1, 2, ...). Each slope and intercept $m_{zi}$, $b_{zi}$ and $m_{si}$, $b_{si}$ defining the piece-wise linear approximation to the error correction curve between successive intermediate temperatures can therefore be associated with a range of the resistance SUM rather than an actual temperature range.

To linearize the output with respect to an input such as applied stress, the calibration equipment calculates the output $VO_{1n}$ that should be observed from the bridge at minimum temperature at several values of stress (n = 1, 2, ...) between zero and maximum assuming the output is a linear function of stress from zero to maximum. The calibration equipment also calculates the magnitude $VO_{tcn}$ of the output of the bridge circuit at minimum temperature and the same values of stress using equation (3), the bridge completion constants and the values GA, GB of the strain gauge resistances at these values of stress and temperature. For each value n of stress, the difference $\Delta_n$ is determined between the value $VO_{tcn}$ and the calculated linearized value $VO_{1n}$:

$$\Delta_n = VO_{tcn} - VO_{1n} (n = 1, 2, \ldots) \qquad (10)$$

Figure 8:
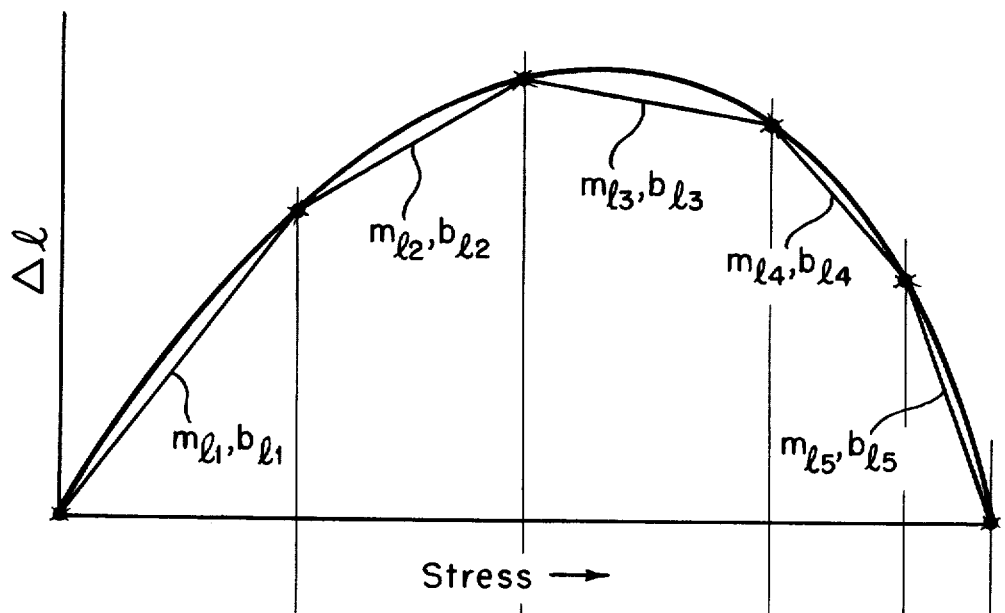
FIG. 8 is a plot of output error versus applied stress.
Figure 9:
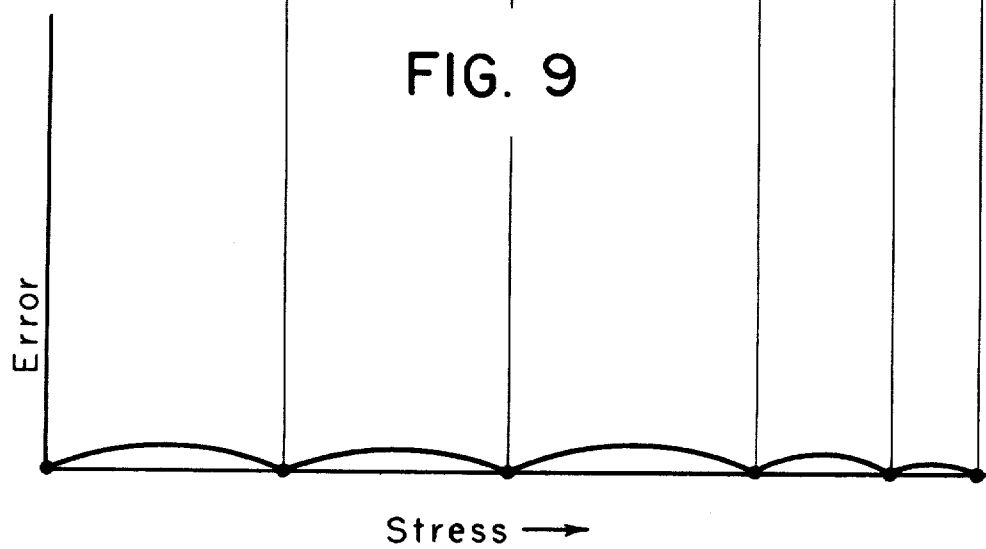
FIG. 9 is a plot of the typical output error versus applied stress when compensated in accordance with my invention.

As shown in FIG. 8 these differences may be linked together by straight lines to form a piece-wise linear approximation to the non-linearity compensation curve versus the values of $VO_{tcn}$ for $n = 1, 2, \ldots$ The calibration equipment calculates the slopes $m_{1n}$ and intercepts $b_{1n}$ of each of these piece-wise linear components and retains this information and the ranges of $VO_{tcn}$ for which each slope and intercept is used for inclusion in the table of correction constants. Use of these correction constants will reduce the linearity error to a curve such as that shown in FIG. 9. Again the use of five to seven intermediate values n has given satisfactory results but fewer or more values may be used as accuracy requires.

As will be apparent, this use of a table of correction factors which associates ranges of $VO_{tcn}$ with set of linearity correction factors assumes that the values of the temperature compensated output $VO_{tcn}$ of the bridge circuit are monotonic with applied stress and substantially independent of temperature. Within the range of accuracy otherwise achievable with my invention, these conditions are attainable.

The bridge completion constants and the table of correction constants are then stored in programmable read only memory 73 of the microcomputer that is connected to the pair of strain gauges for which these constants were calculated. The four bridge completion constants provide the constants needed to calculate equation (3). One group of correction constants associates a set of slopes and intercepts for a piece-wise linear approximation to a zero error correction curve with the resistance values SUM over which the individual approximations are to be used. A second group associates a set of slopes and intercepts for a piece-wise linear approximation to a span error correction curve with the resistance values SUM over which the individual approximations are to be used. A third group associates a set of slopes and intercepts for a piece-wise linear approximation to a linearity correction curve with the bridge output values over which the individual approximations are to be used.

After the constants are stored in its memory, apparatus 20 may be used like any strain gauge sensor in the myriad applications to which strain gauges are applied. Once the gauges are connected so as to monitor the phenomenon of interest, scanner 40 may be operated in endless cycles in which it successively reads the voltage drops V1, V2, V3, V4 across precision resistor 34, strain gauge 36, 37 and precision resistor 35, respectively. The analog signals read by scanner 40 are converted to digital form by A/D converter 50 and entered into microcomputer 60 for calculation of the output.

Figure 10:
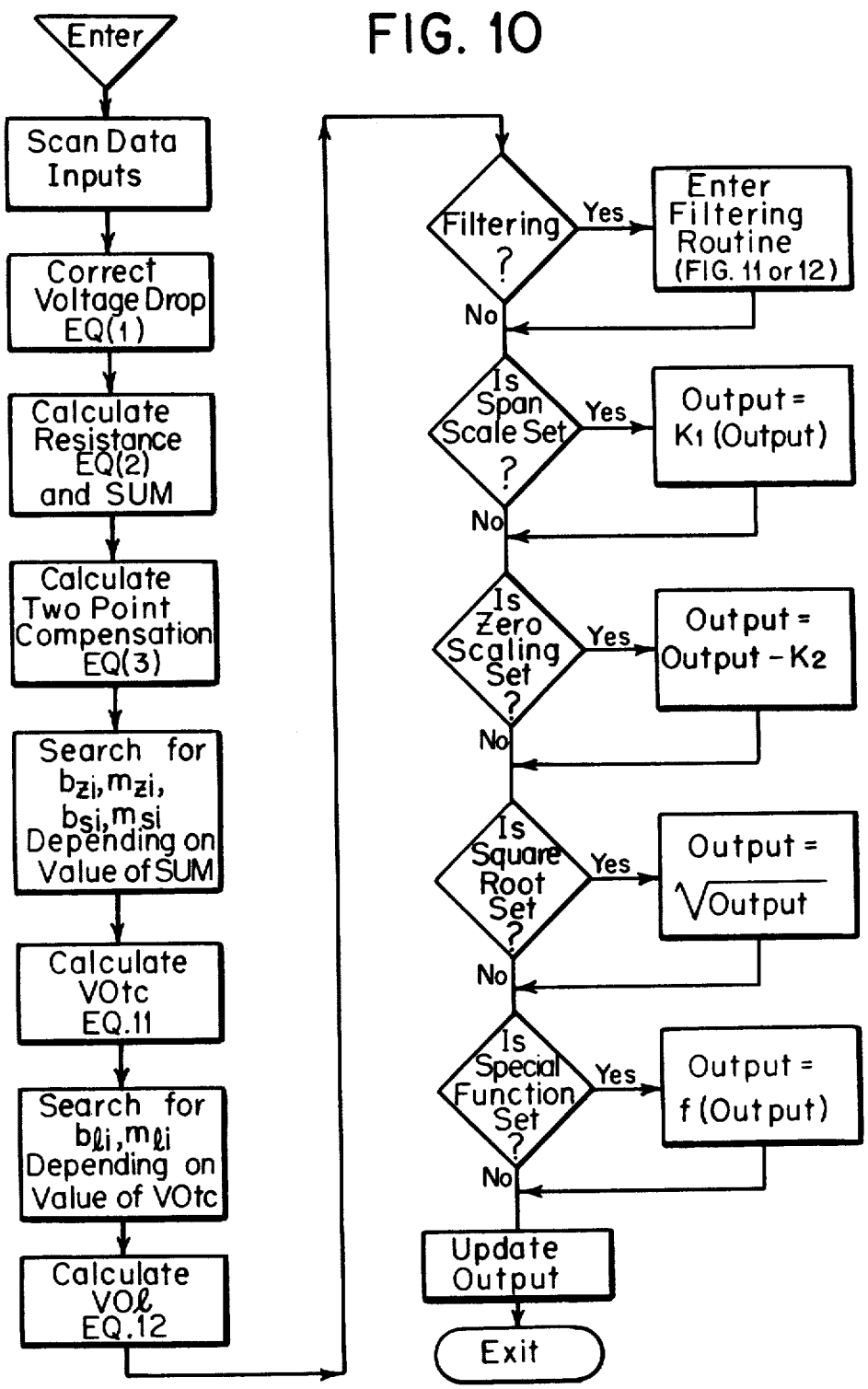
FIG. 10 is a flow chart of an illustrative embodiment of the method used in practicing my invention.

As enumerated in FIG. 10, microcomputer 60 receives the measured voltage drops and corrects them for voltage offset and temperature related errors in accordance with equation (1). The resistances GA, GB of gauges 36, 37 are then calculated in accordance with equation (2); and from these values the total gauge resistance, SUM, is calculated.

Next, the output VO of the bridge for two point temperature and span compensation is calculated using equation (3) and the four bridge completion constants stored in memory 73 of microcomputer 60.

To perform secondary temperature compensation the resistance value SUM is used to select appropriate slopes and intercepts for calculating zero point compensation at that resistance value. These values are then used to calculate the temperature compensated output $VO_{tc}$ as follows:

$$VO_{tc} = (VO - (b_{zi} + m_{zi}\,\text{SUM})) \cdot (b_{si} + m_{si}\,\text{SUM}) \tag{11}$$

where the terms are as defined above and $b_{zi}$, $m_{zi}$, $b_{si}$ and $m_{si}$ are the slopes and intercepts for temperature and span compensation at the value of SUM.

Finally, the temperature compensated output is corrected for non-linearity with stress by selecting from the table of correction constants the appropriate slope and intercept for correction for non-linearity at that value of stress. These values are then used to calculate the linearized output $VO_1$ as follows:

$$VO_1 = VO_{tc} - (b_{1n} + m_{1n} VO_{tc}) \tag{12}$$

where the terms are as defined above and $b_{1n}$ and $m_{1n}$ are the slope and intercept for linearity compensation at the value of $VO_{tc}$.

If desired, the output $VO_1$ may then be filtered and/or processed in any number of special function routines. Illustrative special functions shown in FIG. 10 include span scaling, zero scaling and square root. Others will be evident to those skilled in the art. Finally, the output from microcomputer 60 is updated and the appropriate signal applied to output circuits 80. Microcomputer 60 then recycles, reads another set of voltages V1 through V4, and commences anew the process of calculating the output.

Numerous methods may be used for filtering the output signal $VO_1$. The filtering step is used to cope with the inherent granularity in the digital representation of the analog continuum. The magnitude of this granularity is a function of the resolution and repeatability of the A/D converter. The granularity constitutes "digital noise" which is random in nature and distributed about the mean process variable. This noise can be reduced by use of various averaging techniques. One common technique is exponential filtering which produces a filtered output voltage signal, $VO_f$, as follows:

$$VO_f = A(VO_1) + (1 - A)VO_f' \tag{13}$$

where A is a number between 0 and 1 and $VO_f'$ is the immediately previous filter output. Alternatively, the filtered output voltage signal may be a running average in which the means value of the last N measurements of the process variable is used as the output. However, since the output is the mean value of N measurements, the response to a step change in the process variable requires $N + 1$ measurement updates.

In order to improve the response time to changes in the process variable while minimizing the effects of random noise, I prefer to test each newly calculated value $VO_1$ to determine if it is sufficiently different from the previous values that it is likely to represent a new process value. Where the test is satisfied, the newly calculated value is accepted as the new process value. Otherwise, it is merely added to the running average.

Figure 11:
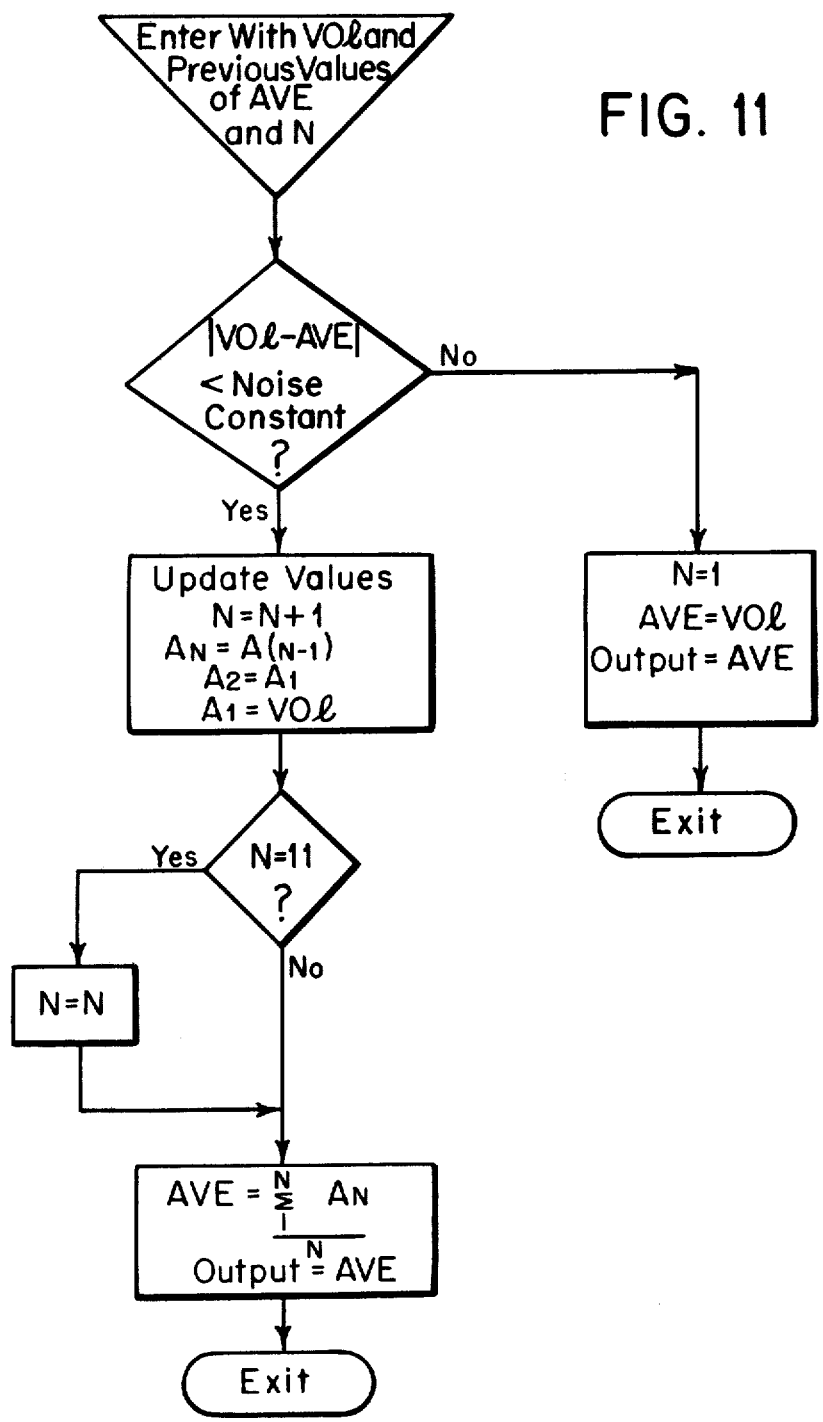
FIGS. 11 and 12 are flow charts of subroutine that may be used in the practice of my invention.

There are numerous routines for performing such a test. In one such technique depicted in FIG. 11, the routine is entered with the linearized value $VO_1$ and previously calculated values of the average output AVE and the number N of the values in this average. The new value $VO_1$ is tested against the average value AVE to determine if the absolute value of the difference is less than a noise constant which is equal to three standard deviations of the measured noise. If it is not, the previous average value is replaced by the new value $VO_1$ and this new average value becomes the output.

Otherwise the running average is updated and the updated average value is supplied as the output.

The number N of values used in the running average can vary from two to some predetermined limit; and the more values used in the average the better the filtering. In practice, I have set the maximum value of N at 10 since this provides about a 3 to 1 reduction in random noise while permitting a reasonable response time to changes in the process variable that are smaller than the noise constant. If desired, this technique can be extended so that the response of the output varies in accordance with the magnitude of the difference between $VO_1$ and AVE. For example, the number N of values used in calculating the new value of AVE can vary inversely with the magnitude of the difference between $VO_1$ and AVE.

Another problem that occurs in digital systems using A/D converters is associated with occasional noise spikes. If such a spike occurs during a data scan by scanner 40, the calculated output will not represent the process variable. If the difference between the calculated output and the average value exceeds the noise constant, the filtering process of FIG. 11 will discard the running average of good data in favor of the noise spike.

Figure 12:
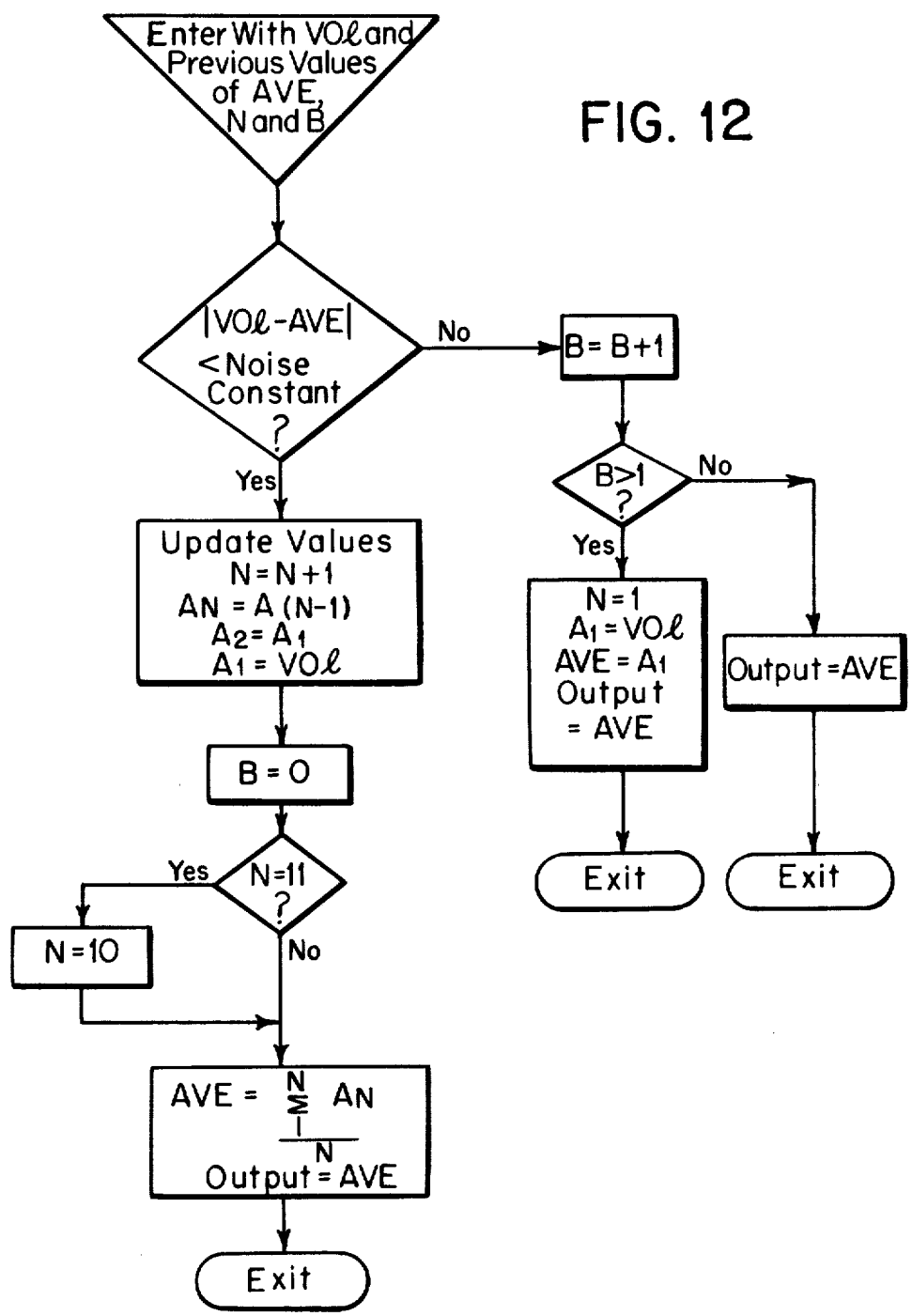

To minimize the likelihood of such an event, I prefer to make an additional logical test as shown in the flow chart of FIG. 12. When the new value $VO_1$ exceeds the average value AVE by the noise constant, this new value is held out of the calculation of the average and the previous value of the running average is used as the output. If the next data scan results in an output within the predetermined limit, the previous reading is considered to be bad data and is discarded. If, however, the second data scan also exceeds the noise limit, both outputs are considered to be good data and the output follows the last data scan.

Illustrative resistance values for the strain gauges 36, 37 used in the practice of my invention are about 750 ohms ± 20% at7 0° F. (−18° C.) and about 1500 ohms ± 20% at 180° F. (82° C.) The resistances of the precision resistors may be about 1000 ohms; and their change in resistance with respect to temperature should be relatively constant at least when compared to the change in resistance of the strain gauges. The lower the temperature coefficient of resistance of the precision resistors, the more accurate will be the transducer; and in practicing the invention, I perfer to use 0.1% wire-wound resistors having a change in resistance of 5 parts per million (ppm) per °C. Obviously larger temperature coefficients can be used in the practice of the invention with attendant loss in accuracy. Conceivably, even carbon resistors could be used in practicing the invention although it is doubtful at present price levels that such a device would be accurate enough to justify the added costs of the microprocessor. The values A and B determined by equations (4) and (5) are each about 350±50 ohms. The values D/(C+D) and VI vary with the particular application.

My invention may be implemented in all manner of devices. In one embodiment, the sensor is a diffused diaphragm strain gauge; and the analog inputs from the precision resistor and the strain gauges are multiplexed by an Intel 4052 analog multiplexer and amplified by a conventional instrumentation amplifier circuit. These voltages are sequentially converted to digital signals by a single Intersil 7104-1 16 bit integrating A/D converter. An Intel 8039 microprocessor with a 2716 EPROM is used to calculate the output. The standard output is a five digit display of pressure scaled to a selectable engineering unit. Alternatively, set point alarms, peak detection and BCD or IEEE-488 interfaces can be provided by the microcomputer. An Intel 8049 microprocessor with 2K masked ROM is a likely replacement for the 8039 microprocessor and EPROM.

In another embodiment sensor 30 is a SIGNATURE (Registered Trademark) strain gauge transducer manufactured by Bristol Babcock Inc. and the microprocessor is a CMOS microprocessor with associated CMOS memory which emulates a 1804 microcomputer. In this embodiment the voltages from the 4052 analog multiplexer are converted to frequencies by a voltage-to-frequency converter. These frequency signals are used as control signals for a pair of 8 bit counters which count the constant clock frequency of the microcomputer. The resulting 16 bit count is proportional to the period of the control frequency and therefore inversely proportional to the analog input voltages. From these values the microprocessor calculates the resistance of the strain gauges. The output of the microprocessor is a standard 4-20 milliamp industrial signal. Optional outputs may include a square root output option for flow applications, pulse duration modulation, and frequency and/or other serial asynchronous communication schemes.

As will be apparent from the foregoing, the invention broadly comprises a computer simulated bridge circuit which compensates for the effects of one or more environmental variables. In the preferred embodiment of the invention, the bridge is a strain gauge Wheatstone bridge and the computer stores a table of bridge completion constants which are used by the computer for zero point and span compensation at two temperatures. Further, the computer stores tables of correction constants which provide for zero point and span compensation at intermediate temperature values as well as correction of non-linearities in the response of the circuit to the applied input. As will be apparent to those skilled in the art, however, numerous variations may be made in the above described device within the scope of my invention.

While I prefer to calculate the bridge constants in accordance with equations (3), (4), and (5), it is possible to practice the invention using nominal values for these constants. Obviously, in such case more of the burden of compensation is shifted to the error correction curves of FIGS. 4, 6, and 8. Similarly, it is possible to practice the invention without even using the span and temperature compensation resistances 111, 112. Likewise other bridge configurations may be used in place of the Wheatstone bridge configuration disclosed above. As will be apparent, precision resistors 34, 35 are used in part to obtain an accurate measure of the current through the strain gauges. Alternatively, a precision current source could be used in place of the voltage supply and precision resistors although such alternative is likely to be more expensive and less accurate.

While it is preferable and simpler to use the sum of the gauge resistances as a measure of temperature, independent temperature sensors can be used in the practice of the invention. Moreover, the invention may also be used to compensate for temperature and stress effects where the pair of strain gauges are not mounted in opposition. In such a case the use of an independent temperature sensor will be a necessity.

As another alternative it is possible to practice my invention using no bridge at all. In this case correction curves must be established which relate the voltage drops across the precision resistor and the strain gauges directly to corrected output values. In essence, in the practice of this alternative what is recorded in the memory of the microcomputer is a set of piece-wise linear approximations to compensation curves which relate the measured output of the resistor and gauges to the correct output at several discrete values of applied stress at several values of temperature. To calculate the corrected output, the micro-computer uses the compensation curve for the closest temperature in excess of that of the strain gauges and the compensation curve for the closest temperature below that of the strain gauges. By interpolation between these compensation curves, a piece-wise linear approximation to a new compensation curve is constructed for the actual temperature of the strain gauges. A correction factor for the measured output of the strain gauges is then determined from the new compensation curve by interpolation on that piece of the linear approximation which corresponds to the measured output of the strain gauges. The corrected output is then obtained by modifying the measured output by the correction factor. While this alternative avoids the use of any bridge, it does so only at the cost of considerable additional memory for storage of the approximations to the curves.

While the invention has been described in terms of compensation for temperature and stress effects on the resistance of strain gauges, it will be recognized that the invention may be practiced on all manner of devices that are affected by all manner of environmental variables. One class of such devices are those which use surrogate values for temperature and/or stress. One example is the use of the sum of the resistances of strain gauges 36, 37 as a measure of temperature. Another example is the case where the stress in the strain gauges is generated by displacement of a device coupled to a cantilevered beam on which the gauges are mounted. There, the displacement of the device may be used as a surrogate for stress since the stress applied is a function of displacement. In such an instance, the correction constants used for span compensation and linearization may be calculated with respect to physical displacements instead of applied stress, thereby providing compensation for non-linearity between the applied displacement and the output signal.

The invention may also be used to compensate for zero point (or constant) value errors, span errors, and non-linearities in the response of all types of resistive devices and not just strain gauges. The techniques detailed above can be used in compensating the errors in any resistive device whose resistance varies as a function of two environmental variables. With suitable modifications the same techniques may be used to compensate for the errors in the resistance of a device whose resistance varies as a function of only one environmental variable. Illustrative resistive devices with which the invention may be practiced include resistance temperature devices, thermistors, potentiometric sensors and Foxboro pressure sensors such as those described in U.S. Pat. No. 4,172,387.

Likewise the same techniques may be applied to compensate for errors in the inductance or capacitance of inductive or capacitive devices whose inductance or capacitance is a function of one or more environmental variables. Obviously, the scanner in such an apparatus would have to be able to read some parameter of the inductive or capacitive device which is related to its inductance or capacitance. Depending on what parameter is read, it may be advantageous to use devices different from the voltage source and precision resistors used in FIG. 3 to obtain a precise measurement of current through the strain gauges. The application of my techniques to such inductive and capacitive devices will be apparent to those skilled in the art in view of the foregoing disclosure.

What is claimed is:

1. A strain gauge transducer circuit comprising:
   first and second strain gauges;
   at least one resistor, said resistor and said strain gauges being connected in series between the terminals of a power supply;
   means for reading the voltage drops across each resistor and strain gauge; and
   a computer to which are applied signals representative of the voltage drops across each resistor and strain gauge, said computer further comprising a processing unit and a memory unit, said memory unit containing a set of bridge completion constants which in conjunction with the signals representative of said voltage drops is used by the processing unit to calculate the output of a bridge circuit that contains said strain gauges and is compensated for zero point and span error at two temperatures.

2. The apparatus of claim 1 wherein the memory unit of said computer further comprises a table of correction constants, said correction constants providing for zero point compensation at one or more additional temperatures.

3. The apparatus of claim 1 wherein the memory unit of said computer further comprises a table of correction constants, said correction constants providing for span compensation at one or more additional temperatures.

4. The apparatus of claim 1 wherein the memory unit of said computer further comprises a table of correction constants, said correction constants providing for zero point compensation and span compensation at one or more additional temperatures.

5. The apparatus of claim 1 wherein the memory unit of said computer further comprises a table of correction constants, said correction constants providing for zero point compensation and span compensation at one or more additional temperatures and non-linearity compensation at at least one value of applied stress between zero and maximum.

6. The apparatus of any one of claims 2, 3, 4 or 5 wherein:
   said first and second strain gauges are mounted on a flexible object so that when one strain gauge is subject to a compressive loading the other strain gauge is subject to a tensile loading; and
   the table of correction constants relates the sum of the resistances of the first and second strain gauges to said correction constants.

7. The apparatus of claim 1 further comprising an analog-to-digital converter that is connected between said reading means and said computer, analog signals representative of the voltage drops across each resistor and strain gauge being applied to said converter which produces digital output signals representative of said voltage drops that are applied to said computer.

8. The apparatus of claim 1 or claim 7 wherein said circuit comprises a single resistor and means for shorting the inputs to said reading means such that said reading means can read the voltage drop across its shorted inputs, whereby one of the signals applied to said computer is representative of the voltage drop across the shorted inputs, said signal being used by said computer to correct the other signals applied to said computer by said reading means.

9. The apparatus of claim 1 wherein the memory unit of said computer further comprises a set of temperature compensation algorithms which can be used by said processing unit to calculate a compensated output for a bridge circuit that contains said strain gauges.

10. The apparatus of claim 1 further comprising:
an output circuit to which is applied the output of said computer, and
means for filtering successive output signals calculated by said computer, said filtering means comprising means for testing each calculated output signal for deviation from an average of previous output signals to said output circuit, means for recording the presence of such a deviation and means for replacing the signal applied to the output circuit with a newly calculated output signal only upon the occurrence of at least two successive deviations from the average of previous output signals.

11. The apparatus of claim 1 wherein said computer stores a signal representative of the resistance of said resistor and a program for calculating the individual resistances of said strain gauges from said signal and the signals representative of the individual voltage drops across each resistor and strain gauge, said strain gauge resistances being used with said bridge completion constants to calculate said compensated bridge circuit output.

12. The method of claim 1 wherein the bridge completion constants are determined by calculating from measured values of the voltage drops across said resistor and said first and second strain gauges at different stresses and temperatures the parameters of a bridge circuit that includes said first and second strain gauges and is compensated for zero point and span error at two temperatures.

13. A strain gauge transducer circuit comprising:
first and second strain gauges;
at least one resistor, said resistor and said strain gauges being connected in series between the terminals of a power supply;
means for reading the voltage drops across each resistor and strain gauge; and
a computer to which are applied signals representative of the voltage drops across each resistor and strain gauge, said computer further comprising a processing unit and a memory unit, said memory unit containing a set of bridge completion constants which in conjunction with the signals representative of said voltage drops is used by the processing unit to calculate the output of a bridge circuit that contains said strain gauges and is compensated for non-linearity between an input that is applied to said strain gauges and an output that would otherwise be calculated using said signals representative of said voltage drops and said bridge completion constants.

14. The apparatus of claim 13 wherein said said non-linearity is constant value error.

15. The apparatus of claim 13 wherein said non-linearity is zero point and span error.

16. The apparatus of claim 13 wherein said non-linearity comprises zero point and span error with respect to temperature and a non-linearity in the output with respect to at least one other input variable.

17. The apparatus of claim 16 wherein said other input variable is stress.

18. A strain gauge transducer circuit comprising:
first and second strain gauges;
at least one resistor, said resistor and said strain gauges being connected in series between the terminals of a power supply;
means for reading the voltage drops across each resistor and strain gauge; and
a computer to which are applied signals representative of the voltage drops across each resistor and strain gauge, said computer further comprising a processing unit and a memory unit, said memory unit containing a set of correction constants which in conjunction with the signals representative of said voltage drops is used by the processing unit to calculate the output of a circuit that contains said strain gauges and is compensated for zero point and span error at two temperatures.

19. A strain gauge transducer circuit comprising:
first and second strain gauges;
at least one resistor, said resistor and said strain gauges being connected in series between the terminals of a power supply;
means for reading the voltage drops across each resistor and strain gauge; and
a computer to which are applied signals representative of the voltage drops across each resistor and strain gauge, said computer further comprising a processing unit and a memory unit, said memory unit containing a set of correction constants which in conjunction with the signals representative of said voltage drops is used by the processing unit to calculate the output of a circuit that contains said strain gauges and is compensated for non-linearity between an input that is applied to said strain gauges and an output that would otherwise be calculated using said signals representative of said voltage drops.

20. The apparatus of claim 19 wherein said non-linearity is constant value error.

21. The apparatus of claim 19 wherein said non-linearity is zero point and span error.

22. The apparatus of claim 19 wherein said non-linearity comprises zero point and span error with respect to temperature and a non-linearity in the output with respect to at least one other input variable.

23. The apparatus of claim 22 wherein said other input variable is stress.

24. The apparatus of any one of claims 1, 13, 18 or 19 wherein each said resistor has a resistance which is relatively constant with respect to that of the strain gauges over the operating range of the transducer circuit.

25. A transducer circuit comprising:
first and second resistive devices each of whose resistance is a function of at least one environmental variable;
at least one resistor, said resistor and said first and second resistive devices being connected in series between the terminals of a power supply;
means for reading the voltage drops across each resistor and resistive device; and a computer to which are applied signals representative of the voltage drops across each resistor and resistive device, said computer further comprising a processing unit and a memory unit, said memory unit containing a set of bridge completion constants which in conjunction with the signals representative of said voltage drops is used by the processing unit to calculate the output of a bridge circuit that contains said resistive devices and is compensated for zero point and span error at two values of one of said environmental variables.

26. The apparatus of claim 25 wherein the memory unit of said computer further comprises a table of correction constants, said correction constants providing for zero point compensation at one or more additional temperatures.

27. The apparatus of claim 25 wherein the memory unit of said computer further comprises a table of correction constants, said correction constants providing for span compensation at one or more additional temperatures.

28. The apparatus of claim 25 wherein the memory unit of said computer further comprises a table of correction constants, said correction constants providing for zero point compensation and span compensation at one or more additional temperatures.

29. The apparatus of claim 25 wherein the memory unit of said computer further comprises a table of correction constants, said correction constants providing for zero point compensation and span compensation at one or more additional temperatures and non-linearity compensation at at least one value of applied stress between zero and maximum.

30. A transducer circuit comprising:
first and second resistive devices each of whose resistance is a function of at least one environmental variable;
at least one resistor, said resistor and said first and second resistive devices being connected in series between the terminals of a power supply;
means for reading the voltage drops across each resistor and resistive device; and
a computer to which are applied signals representative of the voltage drops across each resistor and resistive device, said computer further comprising a processing unit and a memory unit, said memory unit containing a set of bridge completion constants which in conjunction with the signals representative of said voltage drops is used by the processing unit to calculate the output of a bridge circuit that contains said resistive devices and is compensated for non-linearity between an input that is applied to said resistive devices and an output that would otherwise be calculated using said signals representative of said voltage drops and said bridge completion constants.

31. The apparatus of claim 30 wherein said non-linearity is constant value error.

32. The apparatus of claim 30 wherein said non-linearity is zero point and span error.

33. The apparatus of claim 30 wherein said non-linearity comprises zero point and span error with respect to temperature and a non-linearity in the output with respect to at least one other input variable.

34. The apparatus of claim 33 wherein said other input variable is stress.

35. A transducer circuit comprising:
first and second resistive devices each of whose resistance is a function of at least one environmental variable;
least one resistor, said resistor and said first and second resistive devices being connected in series between the terminals of a power supply;
means for reading the voltage drops across each resistor and resistive device; and
a computer to which are applied signals representative of the voltage drops across each resistor and resistive device, said computer further comprising a processing unit and a memory unit, said memory unit containing a set of correction constants which in conjunction with the signals representative of said voltage drops is used by the processing unit to calculate the output of a circuit that contains said resistive devices and is compensated for zero point and span error at two values of one of said environmental variables.

36. A transducer circuit comprising:
first and second resistive devices each of whose resistance is a function of at least one environmental variable;
at least one precision resistor, said precision resistor and said first and second resistive devices being connected in series between the terminals of a voltage supply;
means for reading the voltage drops across each precision resistor and resistive device; and
a computer to which are applied signals representative of the voltage drops across each precision resistor and resistive device, said computer further comprising a processing unit and a memory unit, said memory unit containing a set of correction constants which in conjunction with the signals representative of said voltage drops is used by the processing unit to calculate the output of a circuit that contains said resistive devices and is compensated for non-linearity between an input that is applied to said resistive devices and an output that would otherwise be calculated using said signals representative of said voltage drops.

37. The apparatus of claim 36 wherein said non-linearity is constant value error.

38. The apparatus of claim 36 wherein said non-linearity is zero point and span error.

39. The apparatus of claim 36 wherein said non-linearity comprises zero point and span error with respect to temperature and a non-linearity in the output with respect to at least one other input variable.

40. The apparatus of claim 39 wherein said other input variable is stress.

41. The apparatus of any one of claims 25, 30, 35 or 36 in each said resistor has a resistance which is relatively constant with respect to that of the first and second resistive devices over the operating range of the transducer circuit.

42. A transducer circuit comprising:
first and second devices both of which have a resistance, a capacitance or an inductance that is a function of at least one environmental variable;
means for reading signals representative of the resistance, capacitance or inductance of each of said first and second devices when they are connected to a power supply; and
a computer to which are applied said signals, said computer further comprising a processing unit and a memory unit, said memory unit containing a set of bridge completion constants which in conjunction with said signals is used by the processing unit to calculate the output of a bridge circuit that contains said first and second devices and is compensated for zero point and span error at two temperatures.

43. The apparatus of claim 42 wherein the memory unit of said computer further comprises a table of correction constants, said correction constants providing for zero point compensation at one or more additional temperatures.

44. The apparatus of claim 42 wherein the memory unit of said computer further comprises a table of correction constants, said correction constants providing for span compensation at one or more additional temperatures.

45. The apparatus of claim 42 wherein the memory unit of said computer further comprises a table of correction constants, said correction constants providing for zero point compensation and span compensation at one or more additional temperatures.

46. The apparatus of claim 42 wherein the memory unit of said computer further comprises a table of correction constants, said correction constants providing for zero point compensation and span compensation at one or more additional temperatures and non-linearity compensation at at least one value of applied stress between zero and maximum.

47. A transducer circuit comprising:
first and second devices both of which have a resistance, a capacitance or an inductance that is a function of at least one environmental variable;
means for reading signals representative of the resistance, capacitance or inductance of each of said first and second devices when they are connected to a power supply; and
a computer to which are applied said signals, said computer further comprising a processing unit and a memory unit, said memory unit containing a set of bridge completion constants which in conjunction with said signals is used by the processing unit to calculate the output of a bridge circuit that contains said first and second devices and is compensated for zero point non-linearity between an input that is applied to said first and second devices and an output that would otherwise be calculated using said bridge completion constants and said signals representative of the resistance, capacitance or inductance of said first and second devices.

48. The apparatus of claim 47 wherein said non-linearity is constant value error.

49. The apparatus of claim 47 wherein said non-linearity is zero point and span error.

50. The apparatus of claim 47 wherein said non-linearity comprises zero point and span error with respect to temperature and a non-linearity in the output with respect to at least one other input variable.

51. The apparatus of claim 50 wherein said other input variable is stress.

52. A transducer circuit comprising:
first and second devices both of which have a resistance, a capacitance or an inductance that is a function of at least ambient temperature and applied stress;
means for reading signals representative of the resistance, capacitance or inductance of each of said first and second devices when they are connected to a power supply and subject to variations in ambient temperature and stress; and
a computer to which are applied said signals, said computer further comprising a processing unit and a memory unit, said memory unit containing a set of correction constants which in conjunction with said signals is used by the processing unit to calculate the output of a circuit that contains said first and second devices and is compensated for zero point and span error at two temperatures.

53. A transducer circuit comprising:
first and second devices both of which have a resistance, a capacitance or an inductance that is a function of at least ambient temperature and applied stress;
means for reading signals representative of the resistance, capacitance or inductance of each of said first and second devices when they are connected to a power supply and subject to variations in ambient temperature and stress; and
a computer to which are applied said signals, said computer further comprising a processing unit and a memory unit, said memory unit containing a set of correction constants which in conjunction with said signals is used by the processing unit to calculate the output of a circuit that contains said first and second devices and is compensated for non-linearity between an input that is applied to said first and second devices and an output that would otherwise be calculated using said signals representative of the resistance, capacitance or inductance of said first and second devices.

54. The apparatus of claim 53 wherein said non-linearity is constant value error.

55. The apparatus of claim 53 wherein said non-linearity is zero point and span error.

56. The apparatus of claim 53 wherein said non-linearity comprises zero point and span error with respect to temperature and a non-linearity in the output with respect to at least one other input variable.

57. The apparatus of claim 56 wherein said other input variable is stress.

58. The apparatus of any one of claims 42, 47, 52 or 53 further comprising an element having a resistance, capacitance or inductance that is relatively constant with respect to the resistance, capacitance or inductance of the first and second devices over the operating range of the transducer circuit, signals representative of the resistance, capacitance, or inductance of said element being read by said reading means and used by said processing unit in calculating the output of said circuit.

59. A simulated bridge circuit for use as a transducer comprising:
first and second resistive elements whose resistance is a function of at least one environmental variable;
at least one resistor, said resistor and said resistive elements being connected in series between the terminals of a power supply;
means for reading the voltage drops across each resistor and resistive element;
a computer to which are applied signals representative of the voltage drops across each resistor and resistive element, said computer further comprising a processing unit and a memory unit, said memory unit containing a set of bridge completion constants which in conjunction with the signals representative of said voltage drops is used by the processing unit to calculate the output of a bridge circuit that contains said resistive elements and is compensated for zero point and span error at two temperatures.

60. The apparatus of claim 59 wherein the memory unit of said computer further comprises a table of correction constants, said correction constants providing for zero point compensation at one or more additional temperatures.

61. The apparatus of claim 59 wherein the memory unit of said computer further comprises a table of correction constants, said correction constants providing for span compensation at one or more additional temperatures.

62. The apparatus of claim 59 wherein the memory unit of said computer further comprises a table of correction constants, said correction constants providing for zero point compensation and span compensation at one or more additional temperatures.

63. The apparatus of claim 59 wherein the memory unit of said computer further comprises a table of correction constants, said correction constants providing for zero point compensation and span compensation at one or more additional temperatures and non-linearity compensation at at least one value of applied stress between zero and maximum.

64. The apparatus of claim 59 wherein said resistive elements are strain gauges whose resistance varies as a function of stress and temperature.

65. The apparatus of any one of claim 59 wherein:
said strain gauges are mounted on a flexible object so that when one strain gauge is subject to a compressive loading the other strain gauge is subject to a tensile loading; and
the table of correction constants relates the sum of the resistances of the two strain gauges to said correction constants.

66. The apparatus of claim 59 wherein the bridge circuit that is simulated by said computer is a Wheatstone bridge.

67. A simulated bridge circuit for use as a transducer comprising:
first and second resistive elements whose resistance is a function of at least one environmental variable;
at least one resistor, said resistor and said resistive elements being connected in series between the terminals of a power supply;
means for reading the voltage drops across each resistor and resistive element;
a computer to which are applied signals representative of the voltage drops across each resistor and resistive element, said computer further comprising a processing unit and a memory unit, said memory unit containing a set of bridge completion constants which in conjunction with the signals representative of said voltage drops is used by the processing unit to calculate the output of a bridge circuit that contains said resistive elements and is compensated for non-linearity between an input that is applied to said resistive elements and an output that would otherwise be calculated using said signals representative of said voltage drops and said bridge completion constants.

68. The apparatus of claim 67 wherein the memory unit of said computer further comprises a table of correction constants, said correction constants providing for zero point compensation at three or more temperatures.

69. The apparatus of claim 67 wherein the memory unit of said computer further comprises a table of correction constants, said correction constants providing for span compensation at three or more temperatures.

70. The apparatus of claim 67 wherein the memory unit of said computer further comprises a table of correction constants, said correction constants providing for zero point compensation and span compensation at three or more temperatures.

71. The apparatus of claim 67 wherein the memory unit of said computer further comprises a table of correction constants, said correction constants providing for zero point compensation and span compensation at three or more temperatures and non-linearity compensation at at least one value of applied stress between zero and maximum.

72. The apparatus of any one of claims 67, 68, 69, 70 or 71 wherein the bridge completion constants are selected to compensate for constant value error and span error at two temperatures.

73. The apparatus of claim 67 wherein said resistive elements are strain gauges whose resistance varies as a function of stress and temperature.

74. The apparatus of claim 67 wherein:
said strain gauges are mounted on a flexible object so that when one strain gauge is subject to a compressive loading the other strain gauge is subject to a tensile loading; and
the table of correction constants relates the sum of the resistances of the two strain gauges to said correction constants.

75. The apparatus of claim 67 wherein the bridge circuit that is simulated by said computer is a Wheatstone bridge.

76. A method of compensating for non-linearities in the output of first and second resistive devices with respect to applied inputs comprising the steps of:
determining a set of compensation constants for said first and second resistive devices comprising the steps of:
connecting said resistive devices and at least one resistor in series with a power supply;
measuring the voltage drops across each resistive device and resistor at a plurality of values of a first input variable with a second input variable held constant at a first value and at a plurality of values of the first input variable with the second input variable held constant at a second value; and
calculating from said measured voltage drops the bridge completion constants required for constant valve and span error compensation at said first and second values of said second input variable;
storing the set of compensation constants in the memory of a computer; and
using said set of stored compensation constants to calculate the output of said resistive devices in response to an applied input comprising the steps of:
subjecting said resistive deices to said applied input;
measuring the voltage drops across each resistive device and resistor when said resistive devices are subjected to said applied input; and
calculating the output of a bridge circuit containing said resistive devices when subjected to said applied input using eh measured voltage drops across each resistive device and resistor and said bridge completion constants, whereby an output is determined that is compensated for constant value error and span error.

77. The method of claim 76 wherein the step of determining a set of compensation constants further comprises the steps of calculating the resistance of each resistive device from a known value of the resistance of each resistor and the voltage drops measured across each resistive device and resistor and using said calculated resistances in calculating the bridge completion constants.

78. The method of claim 77 wherein the step of using the stored compensation constants further comprises the steps of calculating the resistance of each resistive device from the known value of the resistance of each resistor and the voltage drops measured across each resistive device and resistor and using said calculated resistances and the bridge completion constants to calculate said compensated bridge circuit output.

79. A method of compensating for non-linearities in the output of first and second resistive devices with respect to applied inputs comprising the steps of:
  determining a set of compensation constants for said first and second resistive devices comprising the steps of:
  connecting said resistive devices and at least one resistor in series with a power supply;
  measuring the voltage drops across each resistive device and resistor at a plurality of values of a first input variable with a second input variable held constant at a first value and at a plurality of values of the first input variable with the second input variable held constant at a second value; and
  calculating from said measured voltage drops the bridge completion constants required to compensate for non-linearity between an input that is applied to said resistive devices and an output that would otherwise be calculated using signals representative of said voltage drops;
  storing the set of compensation constants in the memory of a computer; and
  using said set of stored compensation constants to calculate the output of said resistive devices in response to an applied input comprising the steps of:
  subjecting said resistive devices to said applied input;
  measuring the voltage drops across each resistive device and resistor when said resistive devices are subjected to said applied input; and
  calculating the output of a bridge circuit containing said resistive devices when subjected to said applied input using the measured voltage drops across each resistive device and resistor and said correction constants, whereby an output is determined that is compensated for non-linearity between said applied input and the output that would otherwise be calculated.

80. A method of compensating for non-linearities in the output of first and second resistive devices with respect to applied inputs comprising the steps of:
  determining a set of compensation constants for said first and second resistive devices comprising the steps of:
  connecting said resistive devices and at least one resistor in series with a power supply;
  measuring the voltage drops across each resistive device and resistor at a plurality of values of a first input variable with a second input variable held constant at a first value and at a plurality of values of the first input variable with the second input variable held constant at a second value; and
  calculating from said measured voltage drops a set of correction constants required for constant value and span error compensation at said first and second values of said second input variable;
  storing the set of compensation constants in the memory of a computer; and
  using said set of stored compensation constants to calculate the output of said resistive devices in response to an applied input comprising the steps of:
  subjecting said resistive devices to said applied input;
  measuring the voltage drops across each resistive device and resistor when said resistive devices are subjected to said applied input; and
  calculating the output of a circuit containing said resistive devices when subjected to said applied input using the measured voltage drops across each resistive device and resistor and said correction constants, whereby an output is determined that is compensated for constant value error and span error.

81. A method of compensating for non-linearities in the output of first and second resistive devices with respect to applied inputs comprising the steps of:
  determining a set of compensation constants for said first and second resistive devices comprising the steps of:
  connecting said resistive devices and at least one resistor in series with a power supply;
  measuring the voltage drops across each resistive device and resistor at a plurality of values of a first input variable with a second input variable held constant at a first value and at a plurality of values of the first input variable with the second input variable held constant at a second value; and
  calculating from said measured voltage drops a set of correction constants required to compensate for non-linearity between an input that is applied to said resistive devices and an output that would otherwise be calculated using said signals representative of said voltage drops;
  storing the set of compensation constants in the memory of a computer; and
  using said set of stored compensation constants to calculate the output of said resistive devices in response to an applied input comprising the steps of:
  subjecting said resistive devices to said applied input;
  measuring the voltage drops across each resistive device and resistor when said resistive devices are subjected to said applied input; and
  calculating the output of a circuit containing said resistive devices when subjected to said applied input using the measured voltage drops across each resistive device and resistor and said correction constants, whereby an output is determined that is compensated for non-linearity between said applied input and the output that would otherwise be calculated.

82. The method of any one of claims 76, 79, 80 and 81 wherein the resistive devices are strain gauges, said first input variable is stress and said second input variable is temperature.

83. The method of any one of claims 79, 80 and 81 wherein the resistive devices are strain gauges mounted on a flexible object so that when one strain gauge is subject to a compressive loading the other strain gauge is subject to a tensile loading, said first input variable is stress and said second input variable is temperature, said method further comprising the steps of:

determining from the measured voltage drops across each strain gauge and at least one resistor, the resistance of each strain gauge; and using the sum of the resistances of the two strain gauges as a measure of their temperature both in calculating the constants and in calculating the output.

84. A method of compensating for non-linearities in the output of first and second electrical devices with respect to applied inputs, said devices having a resistance, a capacitance or an inductance that is a function of at least one variable, said method comprising the steps of:

determining a set of compensation constants for said first and second electrical devices comprising the steps of:

measuring a parameter representative of the resistance, capacitance or inductance of each said electrical device when connected to a power supply at a plurality of values of a first input variable with a second input variable held constant at a first value and at a plurality of values of the first input variable with the second input variable held constant at a second value; and calculating from said measured parameters a set of correction constants required to compensate for non-linearity between an input that is applied to said electrical devices and an output that would otherwise be calculated using said measured parameters;

storing the set of compensation constants in the memory of a computer; and using said set of stored compensation constants to calculate the output of said electrical devices in response to an applied input comprising the steps of:

subjecting said electrical devices to said applied input;

measuring the same parameter representative of the resistance, capacitance or inductance of each said electrical device when said devices are subjected to said applied input; and calculating the output of a circuit containing said electrical devices when subjected to said applied input using the measured parameter for each said electrical device and said correction constants, whereby an output is determined that is compensated for non-linearity between said applied input and the output that would otherwise be calculated.

85. A method of compensating for non-linearities in the output of first and second electrical devices with respect to applied inputs, said devices having a resistance, a capacitance or an inductance that is a function of at least one variable, said method comprising the steps of:

determining a set of compensation constants for said first and second electrical devices comprising the steps of:

measuring a parameter representative of the resistance, capacitance or inductance of each said electrical device when connected to a power supply at a plurality of values of a first input variable with a second input variable held constant at a first value and at a plurality of values of the first input variable with the second input variable held constant at a second value; and calculating from said measured parameters a set of correction constants required for constant value and span error compensation at said first and second values of said second input variable;

storing the set of compensation constants in the memory of a computer; and using said set of stored compensation constants to calculate the output of said electrical devices in response to an applied input comprising the steps of:

subjecting said electrical devices to said applied input;

measuring the same parameter representative of the resistance, capacitance or inductance of each said electrical device when said devices are subjected to said applied input; and calculating the output of a circuit containing said electrical devices when subjected to said applied input using the measured parameter for each electrical device and said correction constants, whereby an output is determined that is compensated for constant value error and span error.

* * * * *